US011187345B2

(12) United States Patent
Srinivasa

(10) Patent No.: US 11,187,345 B2
(45) Date of Patent: Nov. 30, 2021

(54) PARAFFIN ACTUATED DIAPHRAGM VALVE

(71) Applicant: Hamilton Sundstrand Corporation, Charlotte, NC (US)

(72) Inventor: Vinay Kumar Srinivasa, Karnataka (IN)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 16/528,727

(22) Filed: Aug. 1, 2019

(65) Prior Publication Data
US 2020/0271237 A1 Aug. 27, 2020

(30) Foreign Application Priority Data

Feb. 27, 2019 (IN) .............................. 201911007680

(51) Int. Cl.
F16K 31/00 (2006.01)
F02D 9/10 (2006.01)
F16K 31/04 (2006.01)
F02D 9/06 (2006.01)

(52) U.S. Cl.
CPC .......... F16K 31/002 (2013.01); F02D 9/1065 (2013.01); F16K 31/047 (2013.01); F01N 2240/36 (2013.01); F02D 9/06 (2013.01)

(58) Field of Classification Search
CPC .......................... F16K 31/002; G05D 23/023
USPC ........................................................ 251/11
See application file for complete search history.

(56) References Cited

U.S. PATENT DOCUMENTS

| 3,168,805 A | 2/1965 | Fleury |
| 3,546,437 A | 12/1970 | Steghart et al. |
| 4,216,902 A * | 8/1980 | Braukmann ......... G05D 23/023 |
| | | 236/42 |
| 5,711,901 A | 1/1998 | Berg et al. |
| 6,016,824 A * | 1/2000 | Watanabe ............. F16K 31/025 |
| | | 137/1 |

(Continued)

FOREIGN PATENT DOCUMENTS

DE 3311493 A1 10/1983
EP 3263996 A1 1/2018
(Continued)

OTHER PUBLICATIONS

Machine translation DE 3311493.*
(Continued)

Primary Examiner — Kevin F Murphy
(74) Attorney, Agent, or Firm — Cantor Colburn LLP

(57) ABSTRACT

A valve includes a valve housing defining a fluid flowpath therethrough, a valve element located in the valve housing and movable in the fluid flowpath to regulate a fluid flow therethrough, and a valve actuator operably connected to the valve element to urge movement of the valve element in the fluid flowpath. The valve actuator includes an actuator housing, a volume of paraffin located in the housing, and an actuator rod located in the actuator housing and operably connected to the valve element, such that phase change of the paraffin urges movement of the actuator rod between a first position and a second position, thereby moving the valve element between a retracted position and an extended position.

18 Claims, 3 Drawing Sheets

(56) References Cited

U.S. PATENT DOCUMENTS

| | | | |
|---|---|---|---|
| 6,247,678 B1* | 6/2001 | Hines | F16K 31/002 |
| | | | 251/11 |
| 6,439,467 B2 | 8/2002 | Mabboux et al. | |
| 6,460,335 B1 | 10/2002 | Buschatz | |
| 6,494,433 B2 | 12/2002 | Mastrangelo et al. | |
| 6,719,268 B2* | 4/2004 | Fukano | F16K 7/14 |
| | | | 251/129.17 |
| 8,240,336 B2 | 8/2012 | Welle | |
| 8,465,629 B2* | 6/2013 | McWhinney | C25B 1/10 |
| | | | 204/252 |
| 8,784,403 B2 | 7/2014 | Cefai et al. | |
| 9,298,195 B2 | 3/2016 | Lamb et al. | |
| 9,400,062 B2* | 7/2016 | Fukano | F03G 7/06 |
| 9,879,796 B2* | 1/2018 | Tallos | G05D 23/02 |
| 10,016,866 B2 | 7/2018 | Morihara et al. | |
| 10,047,730 B2 | 8/2018 | Riley et al. | |
| 2011/0199177 A1 | 8/2011 | Lehto et al. | |
| 2013/0263799 A1 | 10/2013 | Lee et al. | |
| 2015/0316165 A1 | 11/2015 | Fukano et al. | |

FOREIGN PATENT DOCUMENTS

| | | |
|---|---|---|
| GB | 2011072 A | 7/1979 |
| GB | 2177182 A | 1/1987 |
| JP | 5023249 B1 | 9/2012 |

OTHER PUBLICATIONS

European Search Report for European Application No. 19211114.4, dated May 6, 2020, 7 pages.
European Office Action; European Application No. 19211114.4; dated Apr. 9, 2021; 9 pages.

* cited by examiner

PARAFFIN ACTUATED DIAPHRAGM VALVE

CROSS-REFERENCE TO RELATED APPLICATIONS

This application claims the benefit of Indian Application No. 201911007680 filed Feb. 27, 2019, which is incorporated herein by reference in its entirety.

BACKGROUND

Exemplary embodiments pertain to the art of valves and valve control.

In typical valves, liquid or gas flow control through the valve is accomplished utilizing one or more solenoids, or by utilizing manual operation to open and/or close the valve thereby regulating the flow of liquid or gas therethrough. The solenoid control system requires an electronic circuit, which provides pull in current and hold in current. Solenoid-operated valves are often large and relatively heavy, and when any dust particles or other contaminants come in contact with the moving parts of the solenoid, the operation of the solenoid valve becomes very difficult, and in such cases the solenoid may not operate as required. Further, solenoid operated valves typically require a relatively high current to operate the solenoid, and the switching of the solenoid on and off causes electromagnetic interference, or noise, issues. EMI issues.

BRIEF DESCRIPTION

In one embodiment, a valve includes a valve housing defining a fluid flowpath therethrough, a valve element located in the valve housing and movable in the fluid flowpath to regulate a fluid flow therethrough, and a valve actuator operably connected to the valve element to urge movement of the valve element in the fluid flowpath. The valve actuator includes an actuator housing, a volume of paraffin located in the housing, and an actuator rod located in the actuator housing and operably connected to the valve element, such that phase change of the paraffin urges movement of the actuator rod between a first position and a second position, thereby moving the valve element between a retracted position and an extended position.

Additionally or alternatively, in this or other embodiments the valve element is a flexible diaphragm having a movable diaphragm portion connected to the actuator rod and movable across the fluid flowpath via movement of the actuator rod.

Additionally or alternatively, in this or other embodiments the diaphragm is formed from a rubber material.

Additionally or alternatively, in this or other embodiments a heater operably is connected to the actuator housing to heat the actuator housing and thereby heat the volume of paraffin.

Additionally or alternatively, in this or other embodiments a constant voltage source is operably connected to the heater to power operation of the heater.

Additionally or alternatively, in this or other embodiments a pulse width modulation controller is operably connected to the constant voltage source and the heater to control heating time of the heater.

Additionally or alternatively, in this or other embodiments a temperature sensor is located at the actuator housing to detect an actuator temperature, the sensed temperature utilized in operation of the heater.

Additionally or alternatively, in this or other embodiments a switching element is operably connected to the temperature sensor to switch the heater on and or off based on the sensed temperature.

Additionally or alternatively, in this or other embodiments the switching element includes a Mofset.

Additionally or alternatively, in this or other embodiments a plurality of heat sink fins are located at the actuator housing to improve cooling time of the volume of paraffin.

Additionally or alternatively, in this or other embodiments changing the phase of the paraffin from a solid to a liquid urges the actuator rod from a retracted position to an extended position, thereby moving the valve element to restrict the fluid flow through along the flowpath.

In another embodiment, a method of regulating a flow along a fluid flowpath includes changing a phase of a volume of paraffin located in an actuator housing, urging an actuator rod in operable communication with the volume of paraffin between a first position and a second position based on the phase change of the paraffin, and moving a valve element between a retracted position and an extended position by the movement of the actuator rod between the first position and the second position.

Additionally or alternatively, in this or other embodiments the volume of paraffin is heated via a heater operably connected to the actuator to urge the phase change of the volume of paraffin.

Additionally or alternatively, in this or other embodiments the phase change of the volume of paraffin results in volumetric expansion of the paraffin, thus urging the actuator rod toward the second position.

Additionally or alternatively, in this or other embodiments operation of the heater is controlled via a pulse width modulation controller operably connected to the heater.

Additionally or alternatively, in this or other embodiments a temperature of the actuator housing is detected via a temperature sensor, and the heater is operated utilizing the sensed temperature.

Additionally or alternatively, in this or other embodiments a switching element is operably connected to the temperature sensor and the heater to control the operation of the heater.

Additionally or alternatively, in this or other embodiments the switching element is a Mofset.

Additionally or alternatively, in this or other embodiments heat is dissipated from the actuator via one or more heat sink fins disposed at the actuator housing.

Additionally or alternatively, in this or other embodiments the valve element is a diaphragm having a movable diaphragm portion operably connected to the actuator rod, the movable diaphragm portion moved between the retracted position and the extended position with movement of the actuator rod.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
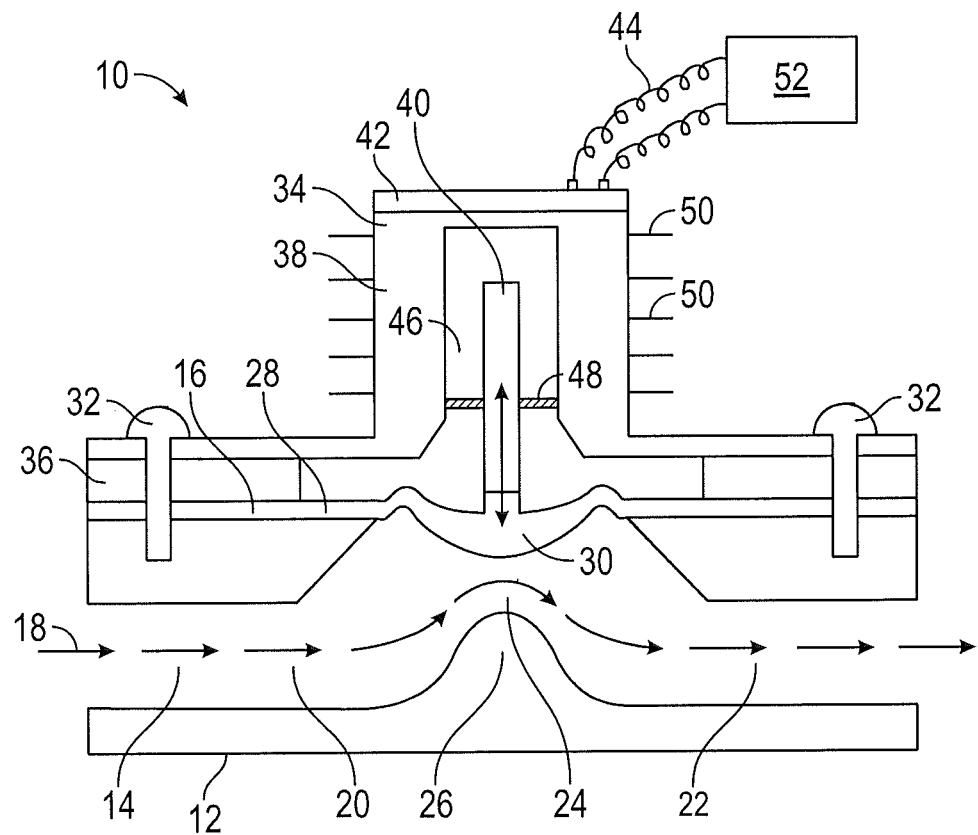
FIG. 1 is a cross-sectional view of an embodiment of a high output paraffin actuated valve in a retracted position.

FIG. 1 is a cross-sectional view of an embodiment of a high output paraffin actuated diaphragm valve 10. The diaphragm valve 10 includes a valve housing 12 defining a fluid flowpath 14 therethrough and a diaphragm 16 located in the valve housing 12 that is movable into and/or out of the fluid flowpath 14 to control a fluid flow 18, which may be, for example, a liquid, gas, or two-phase fluid, along the fluid flowpath 14. In some embodiments, the fluid flowpath 14 includes an upstream flowpath portion 20 and a downstream flowpath portion 22, separated by a flowpath throat 24. In some embodiments, the flowpath throat 24 is defined in part by a protrusion 26 of the valve housing 12 into the fluid flowpath 14.

The diaphragm 16 includes a fixed diaphragm portion 28 and a movable diaphragm portion 30. The fixed diaphragm portion 28 is secured in the valve housing 12 by, for example, one or more screws 32 or other fasteners.

The movable diaphragm portion 30 is operably connected to an actuator, in particular a high output paraffin (HOP) actuator 34. In some embodiments, the HOP actuator 34, the diaphragm 16 and the valve housing 12 are arranged in a stack, with the diaphragm 16 located between the HOP actuator 34 and the valve housing 12. In some embodiments, a spacer 36 is located between the diaphragm 16 and the HOP actuator 34. The HOP actuator 34 includes an actuator housing 38 and an actuator rod 40 located in the actuator housing 38 and connected to the movable diaphragm portion 30. A heater 42 is located at the actuator housing 38 and is connected to an electrical power source 52 by heater wires 44. A volume of paraffin 46 is located in the actuator housing 38, and is retained in the actuator housing 38 by a paraffin retainer 48. The actuator rod 40 extends from inside the actuator housing 38 through the paraffin retainer 48 to the movable diaphragm portion 30.

Figure 2:
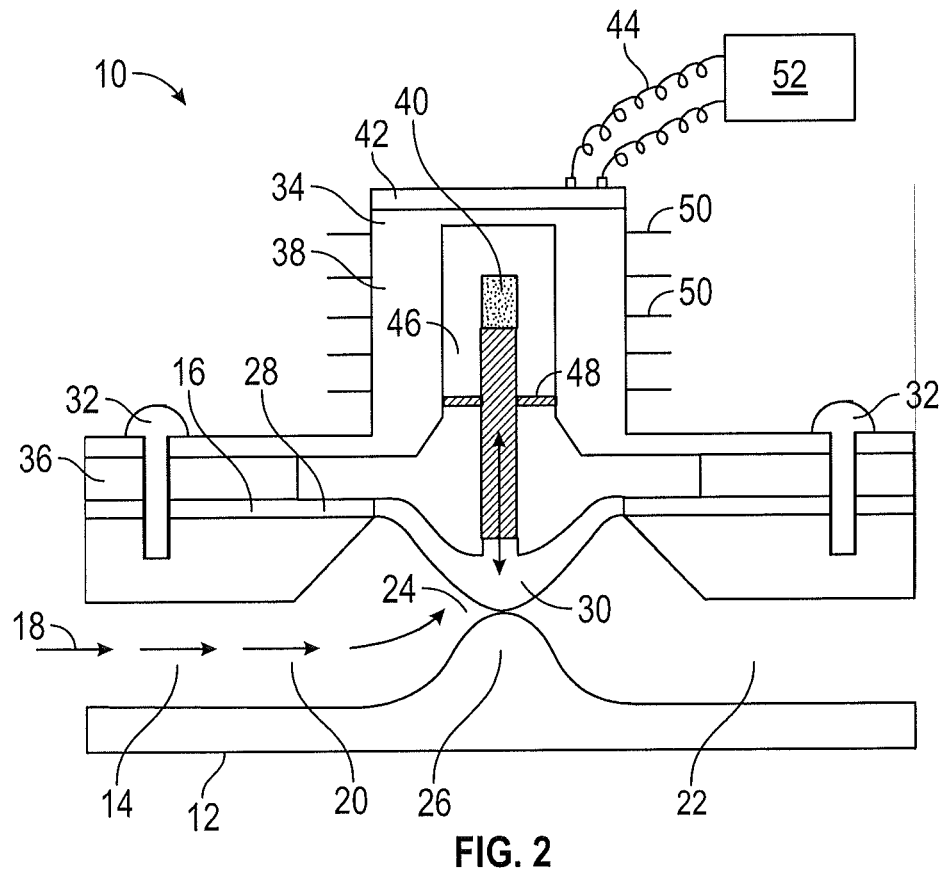
FIG. 2 is a cross-sectional view of an embodiment of a high output paraffin actuated valve in an extended position.

When the heater 42 is activated, the paraffin 46 is heated and expands by, for example, about 15% volumetric expansion, thus pushing the actuator rod 40 further through the paraffin retainer 48. The movement of the actuator rod 40 urges the movable diaphragm portion 30 across the fluid flowpath 14 to an extended or closed position, such as shown in FIG. 2. This restricts the fluid flow 18 along the fluid flowpath 14. In some embodiments, the paraffin 46 utilized is a narrow melting type of paraffin, and may also contain additives to improve heat conduction.

Referring again to FIG. 1, when the heater 42 is deactivated, the paraffin 46 cools and volumetrically contracts. This contraction of the paraffin 46 moves the actuator rod 38 and thus the movable diaphragm portion 30 to a retracted or open position allowing greater fluid flow 18 along the fluid flowpath 14. In some embodiments the actuator housing 38 includes a heat sink configuration, for example a plurality of fins 50 to improve heat dissipation from the HOP actuator 34 when the heater 42 is deactivated. Improved heat dissipation results in faster cooling of the paraffin 46 and thus improved actuation response time.

Figure 3:
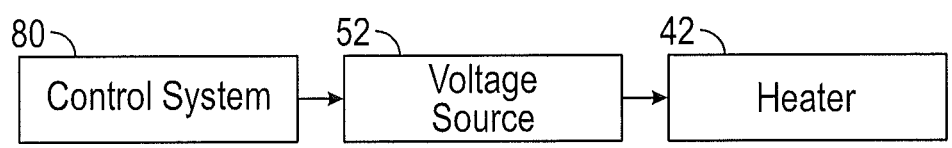
FIG. 3 is a schematic of an embodiment of a control system for a heater of a high output paraffin actuated valve.
Figure 4:
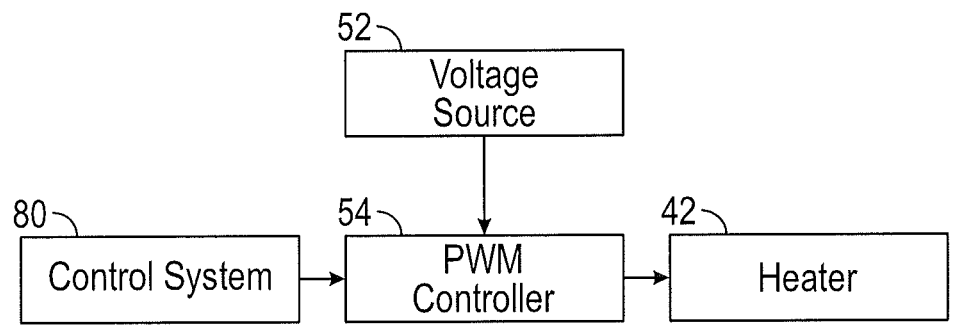
FIG. 4 is a schematic of another embodiment of a control system for a heater of a high output paraffin actuated valve.

Referring now to FIG. 3, in some embodiments a constant voltage source 52 is connected to the heater 42 to provide current flow to the heater 42. The voltage source 52 is activated by a control system 80. In another embodiment, illustrated in FIG. 4, a pulse width modulation (PWM) controller 54 is connected to the voltage source 52 and to the heater 42. The PWM controller 54 is utilized to control the heating time of the heater 42 and the paraffin 46, which controls the valve closing time.

Figure 5:
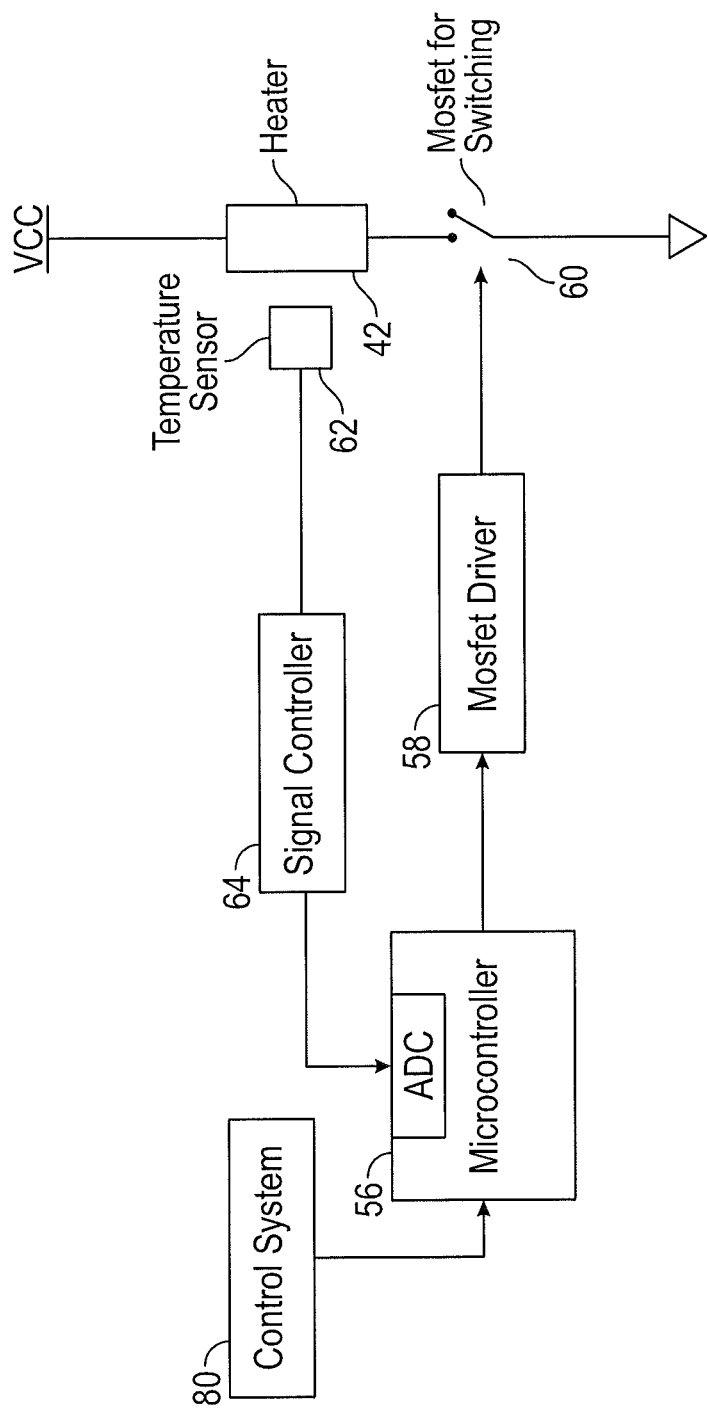
FIG. 5 is a schematic of yet another embodiment of a control system for a heater of a high output paraffin actuated valve.

Referring now to FIG. 5, another embodiment utilizes a microcontroller 56, which generates a PWM signal. A Mofset driver 58 and a Mofset 60 are connected to the microcontroller 56 and to the heater 42 to control the heater 42 temperature. A temperature sensor 62 at the heater 42 detects the heater 42 temperature, and provides feedback to the microcontroller 56, in some embodiments utilizing a signal conditioner 64 to process the temperature signals from the temperature sensor 62. Based on the detected heater 42 temperature, the microcontroller 56 provides a signal to the Mofset driver 58 to switch the Mofset 60, thereby switching current flow on or off as needed from the voltage source 52 through the heater 42. In some embodiments, the microcontroller 56 utilizes an algorithm to generate the PWM signal based on a required actuation time, paraffin material expansion rate, or the like.

The high output paraffin actuated diaphragm valves 10 disclosed herein may be utilized in a wide array of applications including, but not limited to, fuel inerting systems in aircraft, aircraft fuel jettisoning systems, or hydraulic & pneumatic actuators in an aircraft. Complex electronics are not required to turn the valve on or off, where as in a solenoid operated valve, a pull in current and a hold in current are required, requiring more complex electronic control. Diaphragm valve 10 can have highly reduced EMI issues compared to a solenoid operated valve, and dust or contaminations will not affect the device operation. The construction of the valve is less bulky compared to a solenoid operated valve which can be helpful in reducing the overall system weight. Further the diaphragm valve 10 is corrosion resistant and provides smooth operation, and has reduced operational noise and vibration.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A valve comprising:
   a valve housing defining a fluid flowpath therethrough;
   a valve element disposed in the valve housing and movable in the fluid flowpath to regulate a fluid flow therethrough;
   a valve actuator operably connected to the valve element to urge movement of the valve element in the fluid flowpath, the valve actuator including:
   an actuator housing;
   a volume of paraffin disposed in the actuator housing; and
   an actuator rod disposed in the actuator housing, the actuator rod having a first end rigidly connected to the valve element and a second end opposite the first end disposed in the volume of paraffin, such that phase change of the paraffin generates a force acting directly on an axial terminal end face of the second end of the actuator rod to urge movement of the actuator rod between a first position and a second position, thereby moving the valve element between a retracted position and an extended position; and
   a heater operably connected to the actuator housing to heat the actuator housing and thereby heat the volume of paraffin.

2. The valve of claim 1, wherein the valve element is a flexible diaphragm having a movable diaphragm portion connected to the actuator rod and movable across the fluid flowpath via movement of the actuator rod.

3. The valve of claim 2, wherein the diaphragm is formed from a rubber material.

4. The valve of claim 1, further comprising a constant voltage source operably connected to the heater to power operation of the heater.

5. The valve of claim 4, further comprising a pulse width modulation controller operably connected to the constant voltage source and the heater to control heating time of the heater.

6. The valve of claim 1, further comprising a temperature sensor disposed at the actuator housing to detect an actuator temperature, the sensed temperature utilized in operation of the heater.

7. The valve of claim 6, further comprising a switching element operably connected to the temperature sensor to switch the heater on and or off based on the sensed temperature.

8. The valve of claim 7, wherein the switching element includes a Mofset.

9. The valve of claim 1, further comprising a plurality of heat sink fins disposed at the actuator housing to improve cooling time of the volume of paraffin.

10. The valve of claim 1, wherein changing the phase of the paraffin from a solid to a liquid urges the actuator rod from a retracted position to an extended position, thereby moving the valve element to restrict the fluid flow through along the flowpath.

11. A method of regulating a flow along a fluid flowpath, comprising:
    changing a phase of a volume of paraffin disposed in an actuator housing;
    urging an actuator rod extending from the volume of paraffin to a valve element between a first position and a second position based on the phase change of the paraffin, the actuator rod having a first end rigidly connected to the valve element and a second end opposite the first end disposed in the volume of paraffin such that phase change of the paraffin generates a force acting directly on an axial terminal end face of the second end of the actuator rod to urge the movement of the actuator rod between the first position and the second position; and
    moving the valve element between a retracted position and an extended position by the movement of the actuator rod between the first position and the second position; and
    heating the volume of paraffin via a heater operably connected to the actuator housing to urge the phase change of the volume of paraffin.

12. The method of claim 11, wherein the phase change of the volume of paraffin results in volumetric expansion of the paraffin, thus urging the actuator rod toward the second position.

13. The method of claim 11, further comprising controlling operation of the heater via a pulse width modulation controller operably connected to the heater.

14. The method of claim 11, further comprising:
    detecting a temperature of the actuator housing via a temperature sensor; and
    operating the heater utilizing the sensed temperature.

15. The method of claim 14, further comprising a switching element operably connected to the temperature sensor and the heater to control the operation of the heater.

16. The method of claim 15, wherein the switching element is a Mofset.

17. The method of claim 11, further comprising dissipating heat from the actuator housing via one or more heat sink fins disposed at the actuator housing.

18. The method of claim 11, wherein the valve element is a diaphragm having a movable diaphragm portion operably connected to the actuator rod, the movable diaphragm portion moved between the retracted position and the extended position with movement of the actuator rod.

* * * * *